(12) United States Patent
Luo

(10) Patent No.: US 12,572,677 B2
(45) Date of Patent: Mar. 10, 2026

(54) NEURAL NETWORK PARAMETER DEPLOYMENT METHOD, AI INTEGRATED CHIP, AND RELATED APPARATUS THEREOF

(71) Applicant: Huawei Technologies Co., Ltd., Shenzhen (CN)

(72) Inventor: Huamin Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 18/437,676

(22) Filed: Feb. 9, 2024

(65) Prior Publication Data

US 2024/0211615 A1 Jun. 27, 2024

Related U.S. Application Data

(63) Continuation of application No. PCT/CN2022/094495, filed on May 23, 2022.

(30) Foreign Application Priority Data

Aug. 11, 2021 (CN) .......................... 202110919731.6

(51) Int. Cl.
*G06F 21/62* (2013.01)
*G06N 3/063* (2023.01)

(52) U.S. Cl.
CPC ......... *G06F 21/6209* (2013.01); *G06N 3/063* (2013.01)

(58) Field of Classification Search
CPC ...... G06F 21/62; G06F 21/6209; G06N 3/063
See application file for complete search history.

(56) References Cited

U.S. PATENT DOCUMENTS

| | | | |
|---|---|---|---|
| 9,286,241 B2 * | 3/2016 | Simmons | ............ G06F 12/1408 |
| 2012/0011087 A1 * | 1/2012 | Aparin | ................... G06N 3/063 |
| | | | 706/26 |
| 2020/0019843 A1 * | 1/2020 | Han | ...................... H04L 9/0894 |
| 2020/0349428 A1 * | 11/2020 | Wang | ..................... G06N 3/063 |
| 2021/0397557 A1 * | 12/2021 | Lee | ..................... G06F 12/0811 |
| 2021/0397771 A1 * | 12/2021 | Kale | .................. G06F 13/4282 |
| 2023/0229899 A1 * | 7/2023 | Kim | ...................... G06N 3/063 |
| | | | 706/25 |
| 2025/0278296 A1 * | 9/2025 | Kim | ..................... G06N 3/0464 |

FOREIGN PATENT DOCUMENTS

CN        110601814 A        12/2019

* cited by examiner

*Primary Examiner* — Shanto Abedin
(74) *Attorney, Agent, or Firm* — Conley Rose, P.C.

(57) ABSTRACT

An AI computing apparatus includes an AI integrated chip and an off-chip memory. The AI integrated chip includes a CPU, an NPU, a first on-chip storage unit, and a second on-chip storage unit. Permission to allow only the NPU to read and permission to allow only the CPU to write are set in the second on-chip storage unit. The off-chip memory stores first neural network code and a first weight parameter that are associated with the NPU. The second on-chip storage unit stores second neural network code and a second weight parameter that are associated with the NPU.

20 Claims, 5 Drawing Sheets

100

10

100

10

AI integrated chip

15

Key storage unit

CPU 11

16

Decryption unit

NPU 12

First on-chip storage unit 13

Second on-chip storage unit

14

17

Third on-chip storage unit

20

Off-chip memory

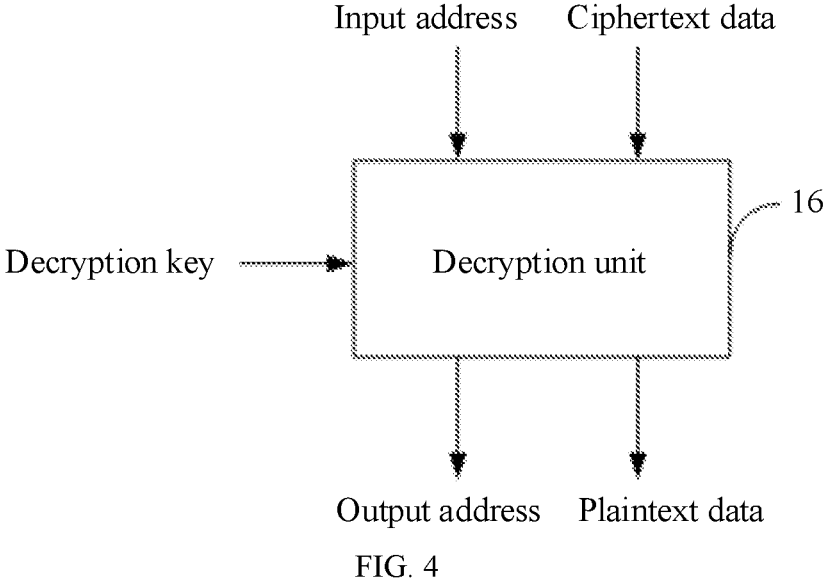

Input address        Ciphertext data

Decryption key        Decryption unit        16

Output address        Plaintext data

FIG. 4

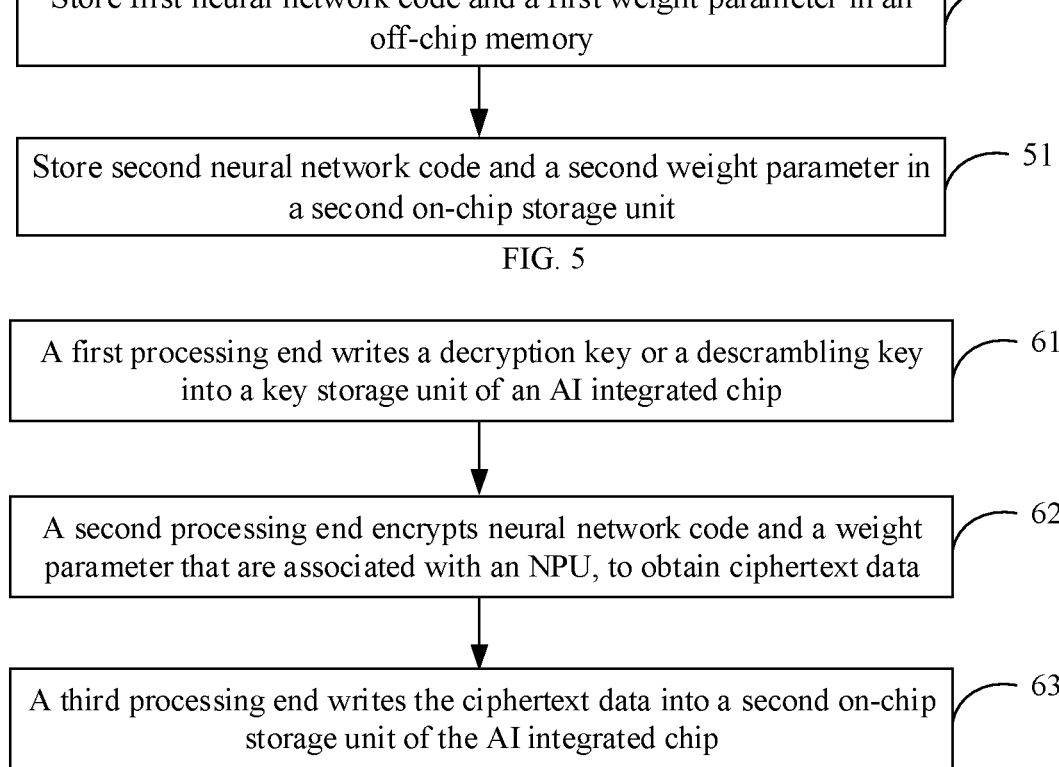

Store first neural network code and a first weight parameter in an off-chip memory — 50

Store second neural network code and a second weight parameter in a second on-chip storage unit — 51

FIG. 5

A first processing end writes a decryption key or a descrambling key into a key storage unit of an AI integrated chip — 61

A second processing end encrypts neural network code and a weight parameter that are associated with an NPU, to obtain ciphertext data — 62

A third processing end writes the ciphertext data into a second on-chip storage unit of the AI integrated chip — 63

FIG. 6

Obtain ciphertext data — 70

Write the ciphertext data into a second on-chip storage unit of an AI integrated chip — 71

1000

Electronic device

1003

1001      First processor

1004      Computer program

First memory

1002

NEURAL NETWORK PARAMETER DEPLOYMENT METHOD, AI INTEGRATED CHIP, AND RELATED APPARATUS THEREOF

CROSS-REFERENCE TO RELATED APPLICATIONS

This application is a continuation application of International Patent Application No. PCT/CN2022/094495, filed on May 23, 2022, which claims priority to Chinese Patent Application No. 202110919731.6, filed on Aug. 11, 2021. The disclosures of the aforementioned applications are hereby incorporated by reference in their entireties.

TECHNICAL FIELD

This application relates to the field of artificial intelligence (AI), and in particular, to a neural network parameter deployment method, an AI integrated chip, an AI computing apparatus, an electronic device, and a computer-readable storage medium.

BACKGROUND

With the evolution of information technologies and AI technologies, AI computing gradually expands from the cloud to terminals. Intelligent terminals with AI computing capabilities are gradually popularized in fields such as smartphones, public safety, assisted driving of vehicles, smart homes, and the like. However, high costs, performance bottlenecks, power consumption bottlenecks, and security risks caused by high computing power required by existing AI computing are always challenges for intelligent terminal devices.

As shown in FIG. 1, an existing AI computing system generally includes a neural-network processing unit (NPU), a central processing unit (CPU), an on-chip static random-access memory (SRAM), and an off-chip dynamic random-access memory (DRAM). A DRAM is configured to store software code, weight parameters, to-be-processed data, and the like required for NPU computing. Software code and weight parameters of an NPU have very high commercial value, and are hard to protect and easy to crack when stored in an off-chip DRAM.

SUMMARY

In view of this, a neural network parameter deployment method, an AI integrated chip, an AI computing apparatus, an electronic device, and a computer-readable storage medium are provided, to improve a security level of NPU software code and a weight parameter.

A first aspect of embodiments of this application discloses an AI computing apparatus. The AI computing apparatus includes an AI integrated chip and an off-chip memory. The AI integrated chip includes a CPU, an NPU, a first on-chip storage unit, and a second on-chip storage unit. The off-chip memory is configured to store first neural network code and a first weight parameter that are associated with the NPU. The second on-chip storage unit is configured to store second neural network code and a second weight parameter that are associated with the NPU, and the NPU is configured to process specified data based on the first neural network code, the second neural network code, the first weight parameter, and the second weight parameter. Permission to allow only the NPU to read and permission to allow only the CPU to write are set in the second on-chip storage unit.

According to this technical solution, the second on-chip storage unit is added to store the second neural network code and the second weight parameter that are associated with the NPU. For example, the second on-chip storage unit may be an embedded non-volatile memory. The second neural network code and the second weight parameter, which are more important, are stored in the second on-chip storage unit, and the first neural network code and the first weight parameter, which are less important, are stored in the off-chip memory, so that a security level of the second neural network code and the second weight parameter can be improved. The NPU may read the second neural network code and the second weight parameter from the second on-chip storage unit, so that a bandwidth requirement for the NPU to access the off-chip memory can be reduced, and the second on-chip storage unit is set to allow only the NPU to read and the CPU to write, so that the security level of the second neural network code and the second weight parameter can be further improved.

In some embodiments, the AI integrated chip further includes a third on-chip storage unit, and the third on-chip storage unit is configured to cache at least a part of the first neural network code and the first weight parameter that are read from the off-chip memory.

According to this technical solution, the third on-chip storage unit is added to cache the first neural network code and the first weight parameter that are read by the NPU from the off-chip memory. For example, the third on-chip memory may be an embedded non-volatile memory. Compared with a speed at which the NPU reads the first neural network code and the first weight parameter from the off-chip memory, a speed at which the NPU reads the first neural network code and the first weight parameter from the third on-chip storage unit is faster, and therefore data processing efficiency of the NPU can be improved.

In some embodiments, the CPU is further configured to receive ciphertext data, and write the ciphertext data into the second on-chip storage unit, and the ciphertext data is obtained by encrypting the second neural network code and the second weight parameter.

According to this technical solution, an AI vendor encrypts neural network code and a weight parameter by using an encryption key, and then sends the encrypted neural network code and the encrypted weight parameter to a device vendor. The device vendor writes ciphertext neural network code and a ciphertext weight parameter into a built-in embedded non-volatile memory (eNVM), such as for example, the second on-chip storage unit of a chip. A decryption key is built into a one-time programmable (OTP) device in the chip, and the decryption key is used to decrypt the ciphertext neural network code and the ciphertext weight parameter. The decryption key is negotiated by the AI vendor and a chip vendor, and then implanted into the chip by the chip vendor. The AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain plaintext neural network code. In this way, intellectual property of the AI vendor is effectively protected.

In some embodiments, the AI integrated chip further includes a key storage unit and a decryption unit. The decryption key is stored in the key storage unit before the ciphertext data is written into the second on-chip storage unit. Permission to allow only the decryption unit to read is set in the key storage unit. The NPU is further configured to read the ciphertext data from the second on-chip storage unit, and invoke the decryption unit to decrypt the ciphertext data by using the decryption key, to obtain the second neural network code and the second weight parameter.

According to this technical solution, the chip vendor writes the decryption key into a key storage unit such as an OTP device in a chip in advance, so that leakage of the decryption key to the device vendor is avoided. In addition, only one read port may be disposed in the key storage unit, and the read port is provided for the decryption unit, so that only the decryption unit is allowed to read the decryption key and the leakage of the decryption key is further avoided. In addition, decryption processing may be performed on the ciphertext data when the NPU reads the ciphertext data from the second on-chip storage unit, so that the device vendor cannot obtain plaintext second neural network code and a plaintext second weight parameter.

In some embodiments, the AI integrated chip further includes a key storage unit and a decryption unit. The key storage unit is configured to store the decryption key. Permission to allow only the decryption unit to read is set in the key storage unit. The CPU is configured to receive the ciphertext data, and invoke the decryption unit to decrypt the ciphertext data by using the decryption key. The ciphertext data is obtained by encrypting the second neural network code and the second weight parameter. The CPU is further configured to write the second neural network code and the second weight parameter that are obtained through decryption into the second on-chip storage unit.

According to this technical solution, the chip vendor writes the decryption key into a key storage unit such as an OTP device in a chip in advance. For example, only one read port is disposed in the OTP device, and the read port is connected to the decryption unit in the chip. The decryption key is negotiated by the AI vendor and the chip vendor, and then implanted into the chip by the chip vendor. The device vendor purchases the ciphertext neural network code and the ciphertext weight parameter from the AI vendor, and purchases the chip into which the decryption key is implanted from the chip vendor. An eNVM is further disposed in the chip. After purchasing the ciphertext neural network code and the ciphertext weight parameter, the device vendor writes the ciphertext neural network code and the ciphertext weight parameter into the eNVM in the chip. The decryption unit in the chip decrypts the ciphertext neural network code and the ciphertext weight parameter by invoking the decryption key that is built into the OTP device, and then uses the decrypted neural network code and the decrypted weight parameter. In this way, the AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain the plaintext neural network code. In this way, intellectual property of the AI vendor is effectively protected.

In some embodiments, the key storage unit includes the OTP device.

According to this technical solution, the decryption key is stored by using the OTP device. Because of a OTP feature of the OTP device, the decryption key can be prevented from being tampered with. In addition, because the OTP device has a strong anti-attack capability and a strong anti-reverse engineering capability, storage security of the decryption key can be improved.

In some embodiments, the off-chip memory is further configured to store the specified data and a processing result of the specified data, and the first on-chip storage unit is configured to cache the specified data read from the off-chip memory.

According to this technical solution, the first on-chip storage unit is used to cache the specified data read from the off-chip memory. For example, the first on-chip storage unit may be an on-chip SRAM. Compared with a speed at which the NPU reads the specified data from the off-chip memory, the speed at which the NPU reads the specified data from the first on-chip storage unit is faster, and therefore a speed at which the NPU reads the specified data can be increased, and data processing efficiency of the NPU can be improved.

In some embodiments, the first on-chip storage unit includes an SRAM, the off-chip memory includes a DRAM, the second on-chip storage unit includes any one of an embedded flash memory (eFlash), eNVM, magnetoresistive RAM (MRAM), or resistive RAM (RRAM), and the third on-chip storage unit includes any one of an eFlash, eNVM, MRAM, or RRAM.

A second aspect of embodiments of this application discloses an AI integrated chip. The AI integrated chip includes a CPU, an NPU, a first on-chip storage unit, and a second on-chip storage unit. The second on-chip storage unit is configured to store neural network code and a weight parameter that are associated with the NPU, and the NPU is configured to process specified data based on the neural network code and the weight parameter. The second on-chip storage unit includes any one of an eFlash, eNVM, MRAM, or RRAM.

According to this technical solution, the second on-chip storage unit is added to store the neural network code and the weight parameter that are associated with the NPU. Compared with an existing solution in which the neural network code and the weight parameter are stored in an off-chip memory, this technical solution can improve a security level of the neural network code and the weight parameter. The NPU reads the neural network code and the weight parameter from the second on-chip storage unit, so that a bandwidth requirement for the NPU to access the off-chip memory can be reduced and performance of the NPU can be improved. In addition, the neural network code and the weight parameter are written into an on-chip eFlash, eNVM, MRAM, or RRAM to be stored, so that a device vendor cannot steal the neural network code and the weight parameter provided by an AI vendor.

In some embodiments, only one read port and one write port are disposed in the second on-chip storage unit, the read port is electrically connected to the NPU, and the write port is electrically connected to the CPU.

According to this technical solution, permission to allow only the NPU to read and permission to allow only the CPU to write are set in the second on-chip storage unit, so that a security level of the neural network code and the weight parameter that are stored in the second on-chip storage unit can be further improved.

In some embodiments, the CPU is further configured to receive ciphertext data, and write the ciphertext data into the second on-chip storage unit, and the ciphertext data is obtained by encrypting the neural network code and the weight parameter.

According to this technical solution, the AI vendor encrypts neural network code and a weight parameter by using an encryption key, and then sends the encrypted neural network code and the encrypted weight parameter to the device vendor. The device vendor writes ciphertext neural network code and a ciphertext weight parameter into a built-in eNWM (the second on-chip storage unit) of a chip. A decryption key is built into an OTP device in the chip, and the decryption key is used to decrypt the ciphertext neural network code and the ciphertext weight parameter. The decryption key is negotiated by the AI vendor and a chip vendor, and then implanted into the chip by the chip vendor. The AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain plaintext neural network code. In this way, intellectual property of the AI vendor is effectively protected.

In some embodiments, the AI integrated chip further includes a key storage unit and a decryption unit. The decryption key is stored in the key storage unit before the ciphertext data is written into the second on-chip storage unit. Permission to allow only the decryption unit to read is set in the key storage unit. The NPU is further configured to read the ciphertext data from the second on-chip storage unit, and invoke the decryption unit to decrypt the ciphertext data by using the decryption key, to obtain the neural network code and the weight parameter.

According to this technical solution, the chip vendor writes the decryption key into a key storage unit such as an OTP device in a chip in advance, so that leakage of the decryption key to the device vendor is avoided. In addition, only one read port may be disposed in the key storage unit, and the read port is provided for the decryption unit, so that only the decryption unit is allowed to read the decryption key and the leakage of the decryption key is further avoided. In addition, decryption processing may be performed on the ciphertext data when the NPU reads the ciphertext data from the second on-chip storage unit, so that the device vendor cannot obtain plaintext second neural network code and a plaintext second weight parameter.

In some embodiments, the AI integrated chip further includes a key storage unit and a decryption unit. The key storage unit is configured to store a decryption key. Permission to allow only the decryption unit to read is set in the key storage unit. The CPU is configured to receive ciphertext data, and invoke the decryption unit to decrypt the ciphertext data by using the decryption key. The ciphertext data is obtained by encrypting the neural network code and the weight parameter. The CPU is further configured to write the neural network code and the weight parameter that are obtained through decryption into the second on-chip storage unit.

According to this technical solution, the chip vendor writes the decryption key into a key storage unit such as an OTP device in a chip in advance. For example, only one read port is disposed in the OTP device, the read port is connected to the decryption unit in the chip. The decryption key is negotiated by the AI vendor and the chip vendor, and then implanted into the chip by the chip vendor. The device vendor purchases the ciphertext neural network code and the ciphertext weight parameter from the AI vendor, and purchases the chip into which the decryption key is implanted from the chip vendor. An eNVM is further disposed in the chip. After purchasing the ciphertext neural network code and the ciphertext weight parameter, the device vendor writes the ciphertext neural network code and the ciphertext weight parameter into the eNVM in the chip. The decryption unit in the chip decrypts the ciphertext neural network code and the ciphertext weight parameter by invoking the decryption key that is built into the OTP device, and then uses the decrypted neural network code and the decrypted weight parameter. In this way, the AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain the plaintext neural network code. In this way, intellectual property of the AI vendor is effectively protected.

In some embodiments, the key storage unit includes the OTP device.

According to this technical solution, the decryption key is stored by using the OTP device. Because of an OTP feature of the OTP device, the decryption key can be prevented from being tampered with. In addition, because the OTP device has a strong anti-attack capability and a strong anti-reverse engineering capability, storage security of the decryption key can be improved.

According to a third aspect, an embodiment of this application provides a neural network parameter deployment method, applied to an AI computing apparatus, and the AI computing apparatus includes an AI integrated chip and an off-chip memory. The AI integrated chip includes a CPU, an NPU, a first on-chip storage unit, and a second on-chip storage unit. The neural network parameter deployment includes: storing, in an off-chip memory, first neural network code and a first weight parameter that are associated with the NPU; and storing, in the second on-chip storage unit, second neural network code and a second weight parameter that are associated with the NPU, where the NPU is configured to process specified data based on the first neural network code, the second neural network code, the first weight parameter, and the second weight parameter. Permission to allow only the NPU to read and permission to allow only the CPU to write are set in the second on-chip storage unit.

According to this technical solution, the second on-chip storage unit is added to store the second neural network code and the second weight parameter that are associated with the NPU. For example, the second on-chip storage unit may be an embedded non-volatile memory. The second neural network code and the second weight parameter, which are more important, are stored in the second on-chip storage unit, and the first neural network code and the first weight parameter, which are less important, are stored in the off-chip memory, so that a security level of the second neural network code and the second weight parameter can be improved. The NPU may read the neural network code and the weight parameter from the second on-chip storage unit, so that a bandwidth requirement for the NPU to access the off-chip memory can be reduced, and the second on-chip storage unit is set to allow only the NPU to read and the CPU to write, so that the security level of the second neural network code and the second weight parameter can be further improved.

In some embodiments, the AI integrated chip further includes a third on-chip storage unit, and the neural network parameter deployment method further includes: reading the first neural network code and the first weight parameter from the off-chip memory and caching the first neural network code and the first weight parameter into the third on-chip storage unit.

According to this technical solution, the third on-chip storage unit is added to cache the first neural network code and the first weight parameter that are read by the NPU from the off-chip memory. For example, the third on-chip memory may be an embedded non-volatile memory. Compared with a speed at which the NPU reads the first neural network code and the first weight parameter from the off-chip memory, a speed at which the NPU reads the first neural network code and the first weight parameter from the third on-chip storage unit is faster, and therefore data processing efficiency of the NPU can be improved.

In some embodiments, the neural network parameter deployment method further includes: receiving ciphertext data sent by an encryption apparatus, and writing the ciphertext data into the second on-chip storage unit, where the ciphertext data is obtained by encrypting the second neural network code and the second weight parameter.

According to this technical solution, an AI vendor encrypts neural network code and a weight parameter by using an encryption key, and then sends the encrypted neural network code and the encrypted weight parameter to a device vendor. The device vendor writes ciphertext neural network code and a ciphertext weight parameter into a built-in eNVM (for example, the second on-chip storage unit) of a chip. A decryption key is built into an OTP device in the chip, and the decryption key is used to decrypt the ciphertext neural network code and the ciphertext weight parameter. The decryption key is negotiated by the AI vendor and a chip vendor, and then implanted into the chip by the chip vendor. The AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain plaintext neural network code. In this way, intellectual property of the AI vendor is effectively protected.

In some embodiments, the neural network parameter deployment method further includes: when the NPU reads the ciphertext data from the second on-chip storage unit, invoking a pre-stored decryption key to decrypt the ciphertext data, to obtain the second neural network code and the second weight parameter.

According to this technical solution, the chip vendor writes the decryption key into a key storage unit such as an OTP device in a chip in advance, so that leakage of the decryption key to the device vendor is avoided. In addition, only one read port may be disposed in the key storage unit, and the read port is provided for the decryption unit, so that only the decryption unit is allowed to read the decryption key and the leakage of the decryption key is further avoided. In addition, decryption processing may be performed on the ciphertext data when the NPU reads the ciphertext data from the second on-chip storage unit, so that the device vendor cannot obtain plaintext second neural network code and a plaintext second weight parameter.

In some embodiments, the neural network parameter deployment method further includes: receiving ciphertext data sent by an encryption apparatus, and invoking a pre-stored decryption key to decrypt the ciphertext data; and writing the second neural network code and the second weight parameter that are obtained through decryption into the second on-chip storage unit, where the ciphertext data is obtained by encrypting the second neural network code and the second weight parameter.

According to this technical solution, the chip vendor writes the decryption key into a key storage unit such as an OTP device in a chip in advance. For example, only one read port is disposed in the OTP device, and the read port is connected to the decryption unit in the chip. The decryption key is negotiated by the AI vendor and the chip vendor, and then implanted into the chip by the chip vendor. The device vendor purchases the ciphertext neural network code and the ciphertext weight parameter from the AI vendor, and purchases the chip into which the decryption key is implanted from the chip vendor. An eNVM is further disposed in the chip. After purchasing the ciphertext neural network code and the ciphertext weight parameter, the device vendor writes the ciphertext neural network code and the ciphertext weight parameter into the eNVM in the chip. The decryption unit in the chip decrypts the ciphertext neural network code and the ciphertext weight parameter by invoking the decryption key that is built into the OTP device, and then uses the decrypted neural network code and the decrypted weight parameter. In this way, the AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain the plaintext neural network code. In this way, intellectual property of the AI vendor is effectively protected.

According to a fourth aspect, an embodiment of this application provides a neural network parameter deployment method, and the neural network parameter deployment method includes: A first processing end writes a decryption key into an OTP device of an AI integrated chip. A second processing end encrypts neural network code and a weight parameter to obtain ciphertext data. A third processing end writes the ciphertext data into an on-chip storage unit of the AI integrated chip. The decryption key is used to decrypt the ciphertext data, and the on-chip storage unit includes any one of an eFlash, eNVM, MRAM, or RRAM.

A difference between this technical solution and an existing solution in which a device vendor writes the decryption key into the AI integrated chip lies in that, according to this technical solution, a chip vendor writes the decryption key into a key storage unit such as an OTP device in a chip in advance. For example, only one read port is disposed in the OTP device, and the read port is connected to a decryption unit in the chip. For example, the decryption key is negotiated by an AI vendor and the chip vendor, and then implanted into the chip by the chip vendor. The device vendor purchases ciphertext neural network code and a ciphertext weight parameter from the AI vendor, and purchases the chip into which the decryption key is implanted from the chip vendor. An eFlash, eNVM, MRAM, or RRAM is further disposed in the chip. After purchasing the ciphertext neural network code and the ciphertext weight parameter, the device vendor writes the ciphertext neural network code and the ciphertext weight parameter into the eFlash, eNVM, MRAM, or RRAM in the chip. The decryption unit in the chip decrypts the ciphertext neural network code and the ciphertext weight parameter by invoking the decryption key that is built into the OTP device, and then uses the decrypted neural network code and the decrypted weight parameter. In this way, the AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain plaintext neural network code. In this way, intellectual property of the AI vendor is effectively protected. In addition, the ciphertext data is stored in an on-chip eFlash, eNVM, MRAM, or RRAM. Compared with an existing solution in which the neural network code and the weight parameter are stored in an off-chip memory, this technical solution can further improve a security level of the neural network code and the weight parameter.

According to a fifth aspect, an embodiment of this application provides a neural network parameter deployment method, and the neural network parameter deployment method includes: obtaining ciphertext data, where the ciphertext data is obtained by encrypting neural network code and a weight parameter; and writing the ciphertext data into an on-chip storage unit of an AI integrated chip, where a decryption key for decrypting the ciphertext data is pre-written into an OTP device of the AI integrated chip, and the on-chip storage unit includes any one of an eFlash, eNVM, MRAM, or RRAM.

According to this technical solution, for a device vendor, the decryption key is the OTP device written by a chip vendor into the AI integrated chip. For example, the decryption key is negotiated by an AI vendor and a chip vendor, and then implanted into a chip by the chip vendor. The device vendor purchases ciphertext neural network code and a ciphertext weight parameter from the AI vendor, and purchases the chip into which the decryption key is implanted from the chip vendor. An eFlash, eNVM, MRAM, or RRAM is further disposed in the chip. After purchasing the ciphertext neural network code and the ciphertext weight parameter, the device vendor writes the ciphertext neural network code and the ciphertext weight parameter into the eFlash, eNVM, MRAM, or RRAM in the chip. The decryption unit in the chip decrypts the ciphertext neural network code and the ciphertext weight parameter by invoking the decryption key built into the OTP device, and then uses the decrypted neural network code and the decrypted weight parameter. The AI vendor does not need to send the decryption key to the device vendor, and the decryption key is built into the chip by the chip vendor. After using the chip, a device of the device vendor can normally use the decryption key to decrypt the ciphertext neural network code and the ciphertext weight parameter. The device vendor or any other third-party vendor cannot obtain plaintext neural network code. In this way, intellectual property of the AI vendor is effectively protected. In addition, the ciphertext data is stored in an on-chip eFlash, eNVM, MRAM, or RRAM. Compared with an existing solution in which the neural network code and the weight parameter are stored in an off-chip memory, this technical solution can further improve a security level of the neural network code and the weight parameter.

In some embodiments, the AI integrated chip includes a meta CPU, an NPU, a first on-chip storage unit, and a second on-chip storage unit, and the writing the ciphertext data into an on-chip storage unit of an AI integrated chip includes: writing the ciphertext data into the second on-chip storage unit, where permission to allow only the NPU to read and permission to allow only the CPU to write are set in the second on-chip storage unit.

According to this technical solution, the NPU may read the neural network code and the weight parameter from the second on-chip storage unit, so that a bandwidth requirement for the NPU to access the off-chip memory can be reduced. In addition, the second on-chip storage unit is set to allow only the NPU to read and the CPU to write, so that a security level of the second neural network code and the second weight parameter can be further improved.

In some embodiments, the neural network parameter deployment method further includes: when the NPU reads the ciphertext data from the second on-chip storage unit, invoking the decryption key stored in the OTP device to decrypt the ciphertext data, to obtain the neural network code and the weight parameter.

According to this technical solution, the chip vendor writes the decryption key into a key storage unit such as an OTP device in a chip in advance, so that leakage of the decryption key to the device vendor is avoided. In addition, only one read port may be disposed in the key storage unit, and the read port is provided for the decryption unit, so that only the decryption unit is allowed to read the decryption key and the leakage of the decryption key is further avoided. In addition, decryption processing may be performed on the ciphertext data when the NPU reads the ciphertext data from the second on-chip storage unit, so that the device vendor cannot obtain plaintext second neural network code and a plaintext second weight parameter.

In some embodiments, the writing the ciphertext data into an on-chip storage unit of an AI integrated chip includes: invoking the decryption key to decrypt the ciphertext data; and writing the neural network code and the weight parameter that are obtained through decryption into the second on-chip storage unit.

According to this technical solution, the chip vendor writes the decryption key into a key storage unit such as an OTP device in a chip in advance, so that leakage of the decryption key to the device vendor is avoided. In addition, only one read port may be disposed in the key storage unit, and the read port is provided for the decryption unit, so that only the decryption unit is allowed to read the decryption key and the leakage of the decryption key is further avoided. In addition, decryption processing may be performed on the ciphertext data when the ciphertext data is written into the on-chip storage unit of the AI integrated chip, so that the device vendor cannot obtain the plaintext second neural network code and the plaintext second weight parameter.

According to a sixth aspect, an embodiment of this application provides a computer-readable storage medium that includes computer instructions. When the computer instructions are run on an electronic device, the electronic device is enabled to perform the neural network parameter deployment method according to the third aspect.

According to a seventh aspect, an embodiment of this application provides an electronic device that includes the AI computing apparatus according to the first aspect or the AI integrated chip according to the second aspect.

According to an eighth aspect, an embodiment of this application provides a computer program product. When the computer program product is run on a computer, the computer is enabled to perform the neural network parameter deployment method according to the third aspect.

It may be understood that the computer-readable storage medium according to the fourth aspect, the electronic device according to the fifth aspect, the computer program product according to the sixth aspect, and the apparatus according to the seventh aspect correspond to the method according to the second aspect or the third aspect. The beneficial effects that can be achieved by the computer-readable storage medium, the electronic device, and the computer program product, refer to beneficial effects in the corresponding method provided above. Details are not described herein again.

BRIEF DESCRIPTION OF DRAWINGS

FIG. 4 is a schematic diagram in which a decryption unit decrypts ciphertext data according to an embodiment of this application;

FIG. 5 is a schematic flowchart of a neural network parameter deployment method according to an embodiment of this application;

FIG. 6 is a schematic flowchart of a neural network parameter deployment method according to another embodiment of this application;

DESCRIPTION OF EMBODIMENTS

It should be noted that, in this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. In this specification, claims, and accompanying drawings of this application, terms "first", "second", "third", "fourth", and the like (if exist) are intended to distinguish between similar objects but do not necessarily indicate a specific order or sequence.

Figure 1:
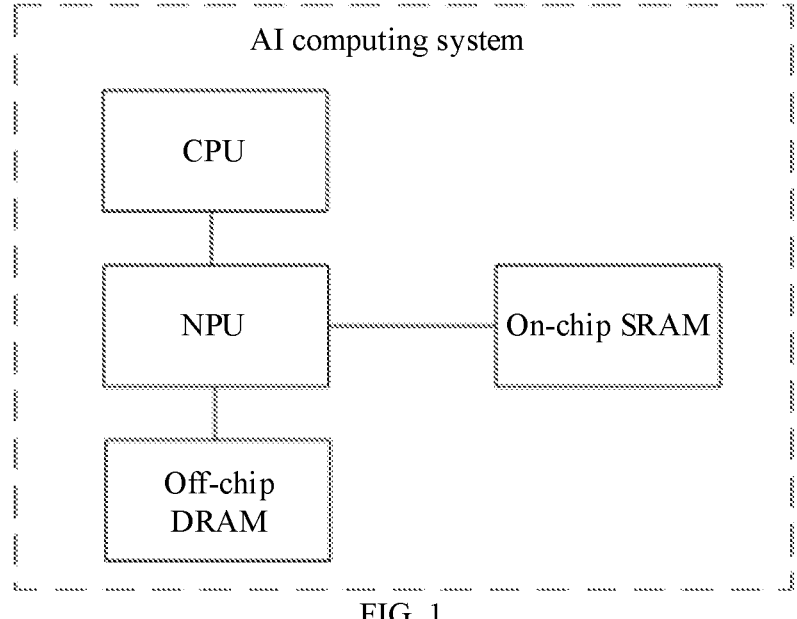
FIG. 1 is a schematic diagram of an architecture of an AI computing system in a conventional technology.
Figure 2:
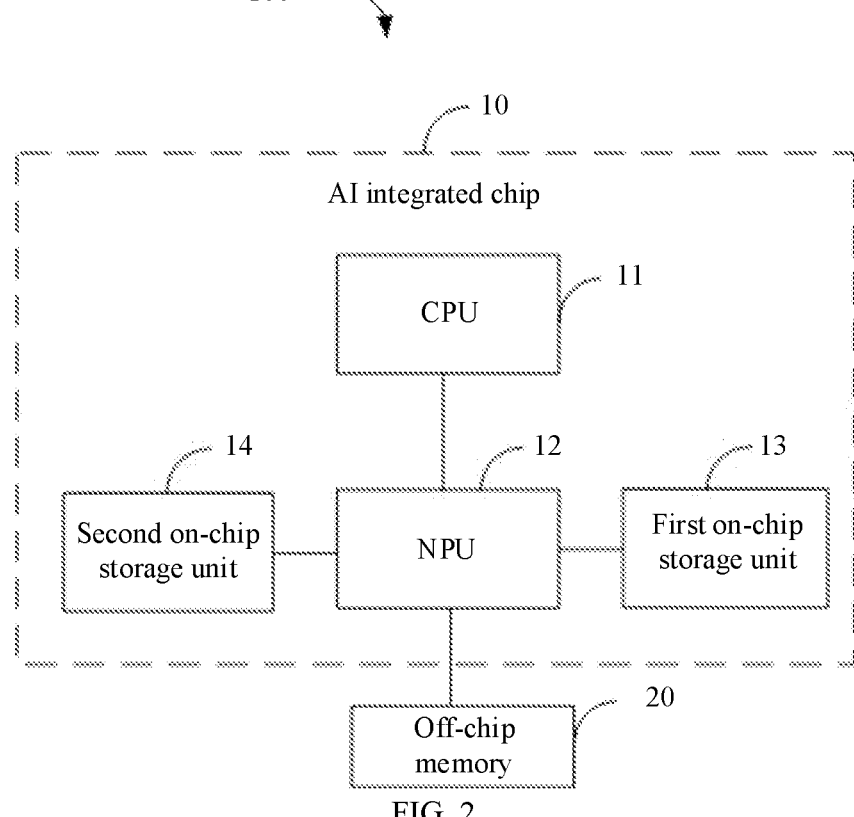
FIG. 2 is a schematic diagram of an architecture of an AI computing apparatus according to an embodiment of this application.

With reference to FIG. 2, the following describes an example of a schematic diagram of an architecture of an AI computing apparatus according to an embodiment of the present disclosure.

The AI computing apparatus 100 may be used in an intelligent terminal, and the intelligent terminal may be a smartphone, a tablet computer, an intelligent vehicle, a smart home device, or the like. The AI computing apparatus 100 may include an AI integrated chip 10 and an off-chip memory 20. The AI integrated chip 10 may include a CPU 11, an NPU 12, a first on-chip storage unit 13, and a second on-chip storage unit 14.

The CPU 11 may include an NPU driver, and the CPU 11 may configure the NPU 12 by using the NPU driver. For example, the CPU 11 may configure, by using the NPU driver, the NPU 12 to process specified data, and allocate a register in the NPU 12 to process the specified data. The specified data may be data specified by the CPU 11. The CPU 11 may allocate a task, and then the NPU 1 executes a corresponding task. An intelligent vehicle is used as an example. Each frame of image shot by a camera may be automatically stored in a specific memory. Each time an image is stored, the CPU 11 may deliver an execution command to the NPU 12, to instruct the NPU 12 to invoke the image from the memory to perform AI model inference.

The NPU 12 is a neural network (NN) computing processor. By learning from a structure of a biological neural network, such as a transfer mode between human brain neurons, the NPU 12 quickly processes input information, and may further perform continuous self-learning. Applications such as intelligent cognition of the intelligent terminal may be implemented through the NPU 12, for example, image recognition, facial recognition, speech recognition, and text understanding. Network code required by the NPU 12 in a data processing process may be divided into first neural network code and second neural network code, and weight data required in the data processing process may be divided into a first weight parameter and a second weight parameter. The second neural network code may be neural network code/neural model code that has high value in the network code, and the second neural network code may be specified by a developer. The first neural network code may be code other than the second neural network code in the network code. The second weight parameter may be a weight parameter that has high value in the weight data, and the second weight parameter may be specified by the developer. The first weight parameter may be a weight parameter other than the second weight parameter in the weight data. The NPU 12 may process the specified data based on the first neural network code, the second neural network code, the first weight parameter, and the second weight parameter.

Based on consideration of hardware costs, the second on-chip storage unit 14 used by the AI computing apparatus 100 has a limited capacity, and may not be able to store all network code and weight data that are required by the NPU 12. The off-chip memory 20 may be configured to store the first neural network code, the first weight parameter, the specified data, and a processing result of the specified data, and the second on-chip storage unit 14 may be configured to store the second neural network code and the second weight parameter so that core neural network code and a core weight parameter of the NPU 12 are stored in the AI integrated chip 10 and a security level of the core neural network code and the core weight parameter can be improved.

For example, the second on-chip storage unit 14 may be an embedded non-volatile memory. The second on-chip storage unit 14 is added in the AI integrated chip 10 to store the second neural network code and the second weight parameter, which are more important, and the first neural network code and the first weight parameter, which are less important, are stored in the off-chip memory 20, so that a security level of the second neural network code and the second weight parameter can be improved. Because the NPU 12 may read the second neural network code and the second weight parameter from the second on-chip storage unit, a bandwidth requirement for the NPU 12 to access the off-chip memory 20 can be reduced and performance of the NPU 12 can be improved. If the AI integrated chip 10 already includes an embedded non-volatile memory, the AI integrated chip 10 may alternatively reuse the embedded non-volatile memory to store the second neural network code and the second weight parameter, which are more important, and does not need to additionally add an embedded non-volatile memory as the second on-chip storage unit 14.

The first on-chip storage unit 13 may be configured to cache the specified data read from the off-chip memory 20. For example, when the NPU 12 processes the first data stored in the off-chip memory 20, the first data may be read from the off-chip memory 20 to the first on-chip storage unit 13, and the first data is cached by using the first on-chip storage unit 13, so that a data processing speed of the NPU can be increased and data processing efficiency can be improved.

In some embodiments, the first on-chip storage unit 13 may include an SRAM, and the second on-chip storage unit 14 may include any one of an (eFlash), an eNVM, a MRAM, or an RRAM. The second on-chip storage unit 14 may alternatively be an embedded storage device of another type. The off-chip memory 20 may include a DRAM.

In some embodiments, to improve privacy of data stored in the second on-chip storage unit 14, permission to allow only the NPU 12 to read and permission to allow only the CPU 11 to write may be designed in the second on-chip storage unit 14. For example, only one read port and one write port may be disposed in the second on-chip storage unit 14. The write port of the second on-chip storage unit 14 is electrically connected only to the CPU 11, to implement the permission to allow only the CPU 11 to write. The read port of the second on-chip storage unit 14 is electrically connected only to the NPU 12, to implement the permission to allow only the NPU 12 to read.

In some embodiments, cryptographic encryption processing or mathematical operation scrambling processing may be selectively performed on the second neural network code and the second weight parameter that are stored in the second on-chip storage unit 14, so that security of the second neural network code and the second weight parameter is improved. An algorithm for encryption processing or scrambling processing may be selected based on an actual requirement. This is not limited in this application. For example, an encryption algorithm may be a symmetric encryption algorithm such as, for example an Advanced Encryption Standard (AES) algorithm, a Data Encryption Standard (DES) algorithm, a ShāngMì 4 (SM4) algorithm, or the like, or an asymmetric encryption algorithm. A scrambling algorithm may be an algorithm customized by the developer, for example, a reversible scrambling algorithm such as mathematical table lookup and reverse processing that are customized by the developer. Encryption processing or scrambling processing may be performed offline outside the AI integrated chip 10. For example, encryption processing or scrambling processing may be performed on the second neural network code and the second weight parameter by an AI vendor (a vendor that develops neural network code and a weight parameter) by using an encryption apparatus (an element or apparatus that is independent of the AI integrated chip 10, such as a computer or a server), to obtain ciphertext data. The encryption apparatus may send the ciphertext data to the AI integrated chip 10. Decryption or descrambling processing of the ciphertext data may be performed in the AI integrated chip 10.

Figure 3A:
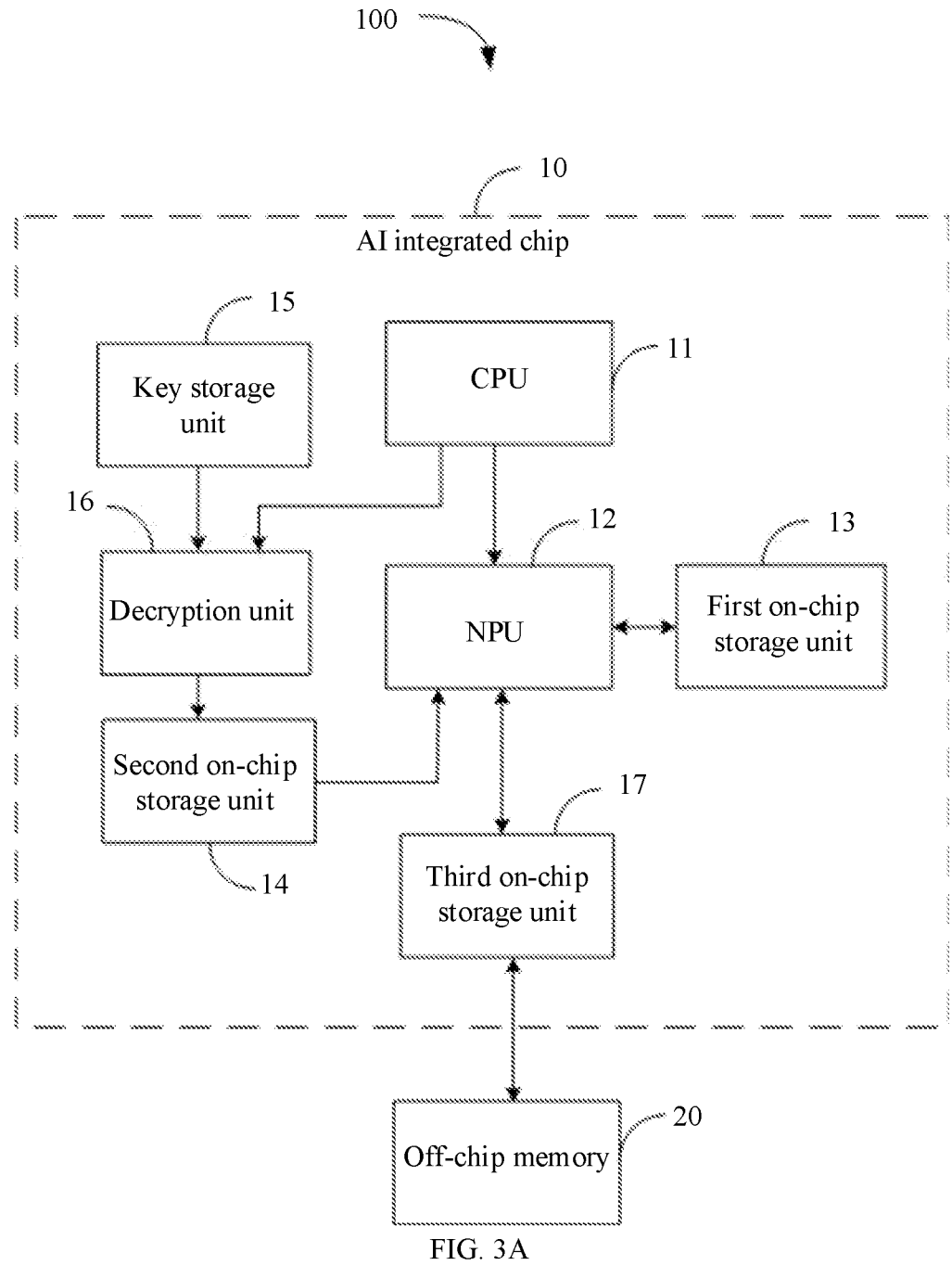
FIG. 3A to FIG. 3B are schematic diagrams of an architecture of an AI computing apparatus according to another embodiment of this application.
Figure 3B:
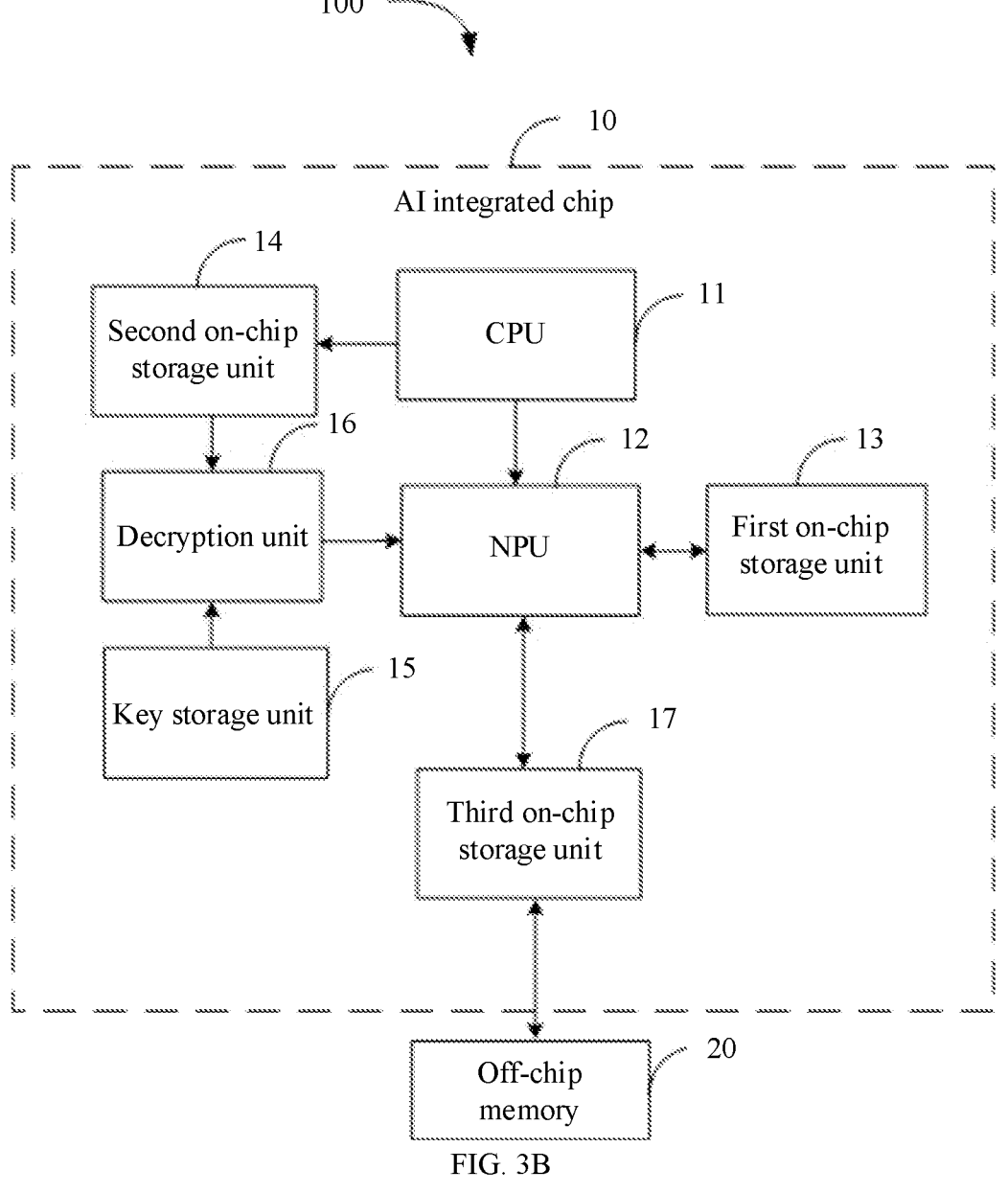

In some embodiments, as shown in FIG. 3A and FIG. 3B, the AI integrated chip 10 may further include a key storage unit 15, a decryption unit 16, and a third on-chip storage unit 17. The key storage unit 15 is configured to store a decryption key or a descrambling key. The decryption unit 16 is configured to perform decryption or descrambling processing on the ciphertext data based on the decryption key or the descrambling key stored in the key storage unit 15. The key storage unit 15 may be a OTP device disposed in the AI integrated chip 10, and the decryption unit 16 may be a hardware circuit that is disposed in the AI integrated chip 10 and that is configured to perform decryption or descrambling processing on the ciphertext data.

The third on-chip storage unit 17 is configured to cache at least a part of the first neural network code and the first weight parameter that are read from the off-chip memory 20.

For example, when the NPU 12 needs to process the specified data by using the first neural network code and the first weight parameter, a part of or all of the first neural network code and the first weight parameter that are stored in the off-chip memory 20 may be read from the off-chip memory 20 to the third on-chip storage unit 17. The third on-chip storage unit 17 caches the first neural network code and the first weight parameter, so that a speed of reading the first neural network code and the first weight parameter by the NPU 12 can be increased, and data processing efficiency can be improved. The third on-chip storage unit 17 may be any one of an eFlash, eNVM, MRAM, or RRAM. The third on-chip storage unit 17 may alternatively be an embedded storage device of another type.

In some embodiments, if the second on-chip storage unit 14 may store all network code and weight data that are required by the NPU 12, for example, the first neural network code, the second neural network code, the first weight parameter, and the second weight parameter are stored in the second on-chip storage unit 14, the off-chip memory 20 may be configured to store the specified data and the processing result of the specified data, and alternatively, the third on-chip storage unit 17 may not be used (for example, the third on-chip storage unit 17 does not need to be disposed to cache the neural network code and the weight parameter that are read from the off-chip memory 20).

As shown in FIG. 3A, the AI integrated chip 10 may perform decryption or descrambling processing on the ciphertext data when the ciphertext data is written into the second on-chip storage unit 14, so that the second neural network code and the second weight parameter are stored in the second on-chip storage unit 14 in a plaintext form. For example, when receiving the ciphertext data, the CPU 11 may invoke the decryption unit 16 to perform decryption or descrambling processing on the ciphertext data, and then write the second neural network code and the second weight parameter that are obtained through decryption or descrambling processing into the second on-chip storage unit 14 for storage.

As shown in FIG. 3B, the AI integrated chip 10 may alternatively not perform decryption or descrambling processing when a ciphertext data file is written into the second on-chip storage unit 14, and store the second neural network code and the second weight parameter in the second on-chip storage unit 14 in a ciphertext form. The NPU 12 performs decryption or descrambling processing on the ciphertext data when reading the ciphertext data from the second on-chip storage unit 14. For example, when reading the ciphertext data from the second on-chip storage unit 14, the NPU may invoke the decryption unit 16 to perform decryption or descrambling processing on the ciphertext data, to obtain the second neural network code and the second weight parameter.

In some embodiments, after the AI integrated chip 10 is powered on, the decryption unit 16 may automatically read the decryption key or the descrambling key stored in the key storage unit 15. For example, the OTP device includes an OTP memory and an OTP controller. After the AI integrated chip 10 is powered on, the OTP controller automatically controls the OTP memory to transfer the decryption key or the descrambling key to the decryption unit 16, so that the decryption unit 16 may automatically complete reading of the decryption key or the descrambling key after the AI integrated chip 10 is powered on. Permission to allow only the decryption unit 16 to read may be set in the key storage unit 15, so that leakage of the decryption key or the descrambling key is avoided. For example, only one read port is disposed in the key storage unit 15, and the read port is electrically connected only to the decryption unit 16.

For example, the second neural network code and the second weight parameter are stored in the second on-chip storage unit 14 in a ciphertext form. When the NPU 12 reads ciphertext data from the second on-chip storage unit 14, the NPU 12 may send an invoking instruction to the decryption unit 16. The decryption unit 16 performs decryption processing on the ciphertext data by using the decryption key only when receiving the invoking instruction of the NPU 12, to obtain the second neural network code and the second weight parameter.

In the foregoing AI computing apparatus, the second on-chip storage unit is added to store the second neural network code and the second weight parameter that are associated with the NPU. The second neural network code and the second weight parameter, which are more important, are stored in the second on-chip storage unit, and the first neural network code and the first weight parameter, which are less important, are stored in the off-chip memory, so that a security level of the second neural network code and the second weight parameter can be improved. The NPU may read the neural network code and the weight parameter from the second on-chip storage unit, so that a bandwidth requirement for the NPU to access the off-chip memory can be reduced. In addition, the second on-chip storage unit is set to allow only the NPU to read and the CPU to write, so that the security level of the second neural network code and the second weight parameter can be further improved, and a device vendor can be prevented from obtaining the decryption key, plaintext second neural network code, and plaintext second weight parameter.

As shown in FIG. 4, an example in which a key stored in the key storage unit 15 is the decryption key is used for description. Ciphertext data of different input addresses corresponds to different decryption keys, and input ciphertext data needs to be decrypted by using a decryption key associated with an input address of the input ciphertext data. The decryption unit 16 may perform decryption processing on the ciphertext data by using the decryption key based on the input address of the ciphertext data, to obtain plaintext data and an output address. The input address is used as decryption processing indication information, and the input address and the output address may be the same. The input address of the ciphertext data may refer to a storage address of the ciphertext data, for example, an address stored in the key storage unit 15.

In some embodiments, if all ciphertext data shares one decryption key, the decryption unit 16 may directly use the decryption key to perform decryption processing on the ciphertext data, to obtain the plaintext data.

FIG. 5 shows a neural network parameter deployment method according to an embodiment of this application. The neural network parameter deployment method is applied to an AI computing apparatus 100. The AI computing apparatus 100 includes an AI integrated chip 10 and an off-chip memory 20. The AI integrated chip 10 includes a CPU 11, an NPU 12, a first on-chip storage unit 13, and a second on-chip storage unit 14.

In some embodiments, network code required by the NPU 12 in a data processing process is divided into first neural network code and second neural network code, and weight data required in the data processing process may be divided into a first weight parameter and a second weight parameter. The second neural network code may be neural network code/neural model code that has high value in the network code, and the second neural network code may be specified by a developer. The first neural network code may be code other than the second neural network code in the network code. The second weight parameter may be a weight parameter that has high value in the weight data, and the second weight parameter may be specified by the developer. The first weight parameter may be a weight parameter other than the second weight parameter in the weight data. In this embodiment, the neural network parameter deployment method may include the following steps.

Step 50: Store the first neural network code and the first weight parameter in the off-chip memory 20.

In some embodiments, the first neural network code and the first weight parameter may be written into the off-chip memory 20 by using the CPU 11 for storage. The off-chip memory 20 may include a DRAM.

Step 51: Store the second neural network code and the second weight parameter in the second on-chip storage unit 14.

In some embodiments, the second neural network code and the second weight parameter may be written into the second on-chip storage unit 14 by using the CPU 11 for storage. The second on-chip storage unit 14 may be any one of an eFlash, eNVM, MRAM, or RRAM. Permission to allow only the NPU 12 to read and permission to allow only the CPU 11 to write may be set in the second on-chip storage unit 14, so that security of the second neural network code and the second weight parameter that are stored in the second on-chip storage unit 14 can be improved.

In some embodiments, the AI integrated chip 10 may further include a third on-chip storage unit 17. When the NPU 12 reads the first neural network code and the first weight parameter from the off-chip memory 20, the read first neural network code and the read first weight parameter may be cached in the third on-chip storage unit 17. The third on-chip storage unit 17 may be any one of an eFlash, eNVM, MRAM, or RRAM. A speed at which the NPU 12 reads the first neural network code and the first weight parameter may be increased by using the third on-chip storage unit 17, so that data processing efficiency is improved.

In some embodiments, cryptographic encryption processing or mathematical operation scrambling processing may be selectively performed on the second neural network code and the second weight parameter that are stored in the second on-chip storage unit 14, so that security of the second neural network code and the second weight parameter is improved. An algorithm for encryption processing or scrambling processing may be selected based on an actual requirement. This is not limited in this application. Encryption processing or scrambling processing may be performed offline outside the AI integrated chip 10. For example, encryption processing or scrambling processing may be performed on the second neural network code and the second weight parameter by using an encryption apparatus independent of the AI integrated chip 10, to obtain ciphertext data. The encryption apparatus may send the ciphertext data to the AI integrated chip 10. Decryption or descrambling processing of the ciphertext data may be performed in the AI integrated chip 10.

The AI integrated chip 10 may perform decryption or descrambling processing on the ciphertext data when the ciphertext data is written into the second on-chip storage unit 14, so that the second neural network code and the second weight parameter are stored in the second on-chip storage unit 14 in a plaintext form. The AI integrated chip 10 may alternatively not perform decryption or descrambling processing when a ciphertext data file is written into the second on-chip storage unit 14, and store the second neural network code and the second weight parameter in the second on-chip storage unit 14 in a ciphertext form. The NPU 12 performs decryption or descrambling processing on the ciphertext data when reading the ciphertext data from the second on-chip storage unit 14.

In some embodiments, if the second on-chip storage unit 14 may store all network code and weight data that are required by the NPU 12, the first neural network code, the second neural network code, the first weight parameter, and the second weight parameter may be stored in the second on-chip storage unit 14.

In the foregoing neural network parameter deployment method, the second on-chip storage unit is added to store the second neural network code and the second weight parameter that are associated with the NPU. The second neural network code and the second weight parameter, which are more important, are stored in the second on-chip storage unit, and the first neural network code and the first weight parameter, which are less important, are stored in the off-chip memory, so that a security level of the second neural network code and the second weight parameter can be improved. The NPU may read the neural network code and the weight parameter from the second on-chip storage unit, so that a bandwidth requirement for the NPU to access the off-chip memory can be reduced. In addition, the second on-chip storage unit is set to allow only the NPU to read and the CPU to write, so that the security level of the second neural network code and the second weight parameter can be further improved, and a device vendor can be prevented from obtaining the decryption key, plaintext second neural network code, and plaintext second weight parameter.

FIG. 6 shows a neural network parameter deployment method according to an embodiment of this application. The neural network parameter deployment method is applied to a first processing end, a second processing end, and a third processing end. The first processing end may be an electronic apparatus on a chip vendor side, the second processing end may be an electronic apparatus on an AI vendor side, and the third processing end may be an electronic apparatus on a device vendor side. The chip vendor provides a hardware module of an AI integrated chip 10. For example, the hardware modules may include a CPU 11, an NPU 12, a first on-chip storage unit 13, a second on-chip storage unit 14, a key storage unit 15, a decryption unit 16, and the like. The AI vendor provides a software module of the AI integrated chip 10. For example, the software module includes neural network code and a weight parameter that are required by the NPU 12 in the AI integrated chip 10. The device vendor performs processing based on the hardware module of the AI integrated chip 10 provided by the chip vendor and the software module of the AI integrated chip 10 provided by the AI vendor, to obtain a terminal that includes the AI integrated chip 10. In this embodiment, the neural network parameter deployment method includes the following steps.

Step 61: The first processing end writes a decryption key or a descrambling key into the key storage unit 15 of the AI integrated chip 10.

In some embodiments, the decryption key or the descrambling key may be negotiated by the chip vendor and the AI vendor, and may be developed by the AI vendor, and then provided to the chip vendor, or may be developed by the chip vendor and then provided to the AI vendor. The key storage unit 15 may be an OTP device. The chip vendor may write the decryption key or the descrambling key into the OTP device of the AI integrated chip 10 by using the first processing end. The chip vendor may provide, to the device vendor, the hardware module of the AI integrated chip 10 into which the decryption key or the descrambling key is implanted. For example, the first processing end may be a burning device. The chip vendor writes the decryption key or the descrambling key into the OTP device of the AI integrated chip 10 by using the burning device.

Step 62: The second processing end encrypts the neural network code and the weight parameter that are associated with the NPU 12, to obtain ciphertext data.

In some embodiments, after the AI vendor completes development of the neural network code and the weight parameter that are associated with the NPU 12, the AI vendor encrypts the neural network code and the weight parameter (an encryption key used for encryption may be the same as the decryption key), to obtain the ciphertext data. For example, the AI vendor may encrypt the neural network code and the weight parameter by using a personal computer (PC) or a server, to obtain the ciphertext data. After obtaining the ciphertext data, the AI vendor may provide the ciphertext data to the device vendor in an online or offline manner. For example, the device vendor may purchase the ciphertext data from the AI vendor in an offline manner, or the device vendor may conduct an online transaction with the AI vendor. For example, the device vendor requests the ciphertext data from a cloud server of the AI vendor. After confirming the online transaction, the cloud server of the AI vendor sends the ciphertext data to the device vendor (a device such as a PC or a server on the device vendor side).

Step 63: The third processing end writes the ciphertext data into the second on-chip storage unit 14 of the AI integrated chip 10.

In some embodiments, the device vendor may write the ciphertext data into the second on-chip storage unit 14 of the AI integrated chip 10 by using the third processing end. In this way, when the AI integrated chip 10 subsequently performs AI inference, the decryption unit 16 may decrypt the ciphertext data by using a built-in decryption key or descrambling key, to obtain plaintext neural network code and a plaintext weight parameter. The second on-chip storage unit 14 may include any one of an eFlash, eNVM, MRAM, or RRAM. For example, the third processing end may be a burning device, and the device vendor writes the ciphertext data into the second on-chip storage unit 14 of the AI integrated chip 10 by using the burning device.

In some embodiments, after the AI integrated chip 10 is powered on, the decryption unit 16 may automatically read the decryption key or the descrambling key stored in the key storage unit 15. For example, the OTP device includes an OTP memory and an OTP controller. After the AI integrated chip 10 is powered on, the OTP controller automatically controls the OTP memory to transfer the decryption key or the descrambling key to the decryption unit 16, so that the decryption unit 16 may automatically complete reading of the decryption key or the descrambling key after the AI integrated chip 10 is powered on. In addition, permission to allow only the decryption unit 16 to read may be set in the OTP device, so that leakage of the decryption key or the descrambling key is avoided. For example, only one read port is disposed in the key storage unit 15, and the read port is electrically connected only to the decryption unit 16.

In some embodiments, if the AI vendor needs to upgrade the neural network code and the weight parameter, the AI vendor may encrypt upgraded neural network code and upgraded weight parameter by using the second processing end, and provide new ciphertext data to the device vendor. The device vendor may write the new ciphertext data into the second on-chip storage unit 14 of the AI integrated chip 10 by using the third processing end.

A difference between the foregoing neural network parameter deployment method and an existing solution in which the device vendor writes the decryption key, the plaintext neural network code and the plaintext weight parameter into the AI integrated chip lies in that, in the foregoing neural network parameter deployment method, the chip vendor writes the decryption key into the AI integrated chip and then provides the AI integrated chip that stores the decryption key to the device vendor, the AI vendor encrypts the neural network code and the weight parameter and provides the neural network code and the weight parameter to the device vendor in a ciphertext form, and the device vendor writes the ciphertext data into the second on-chip storage unit, so that the device vendor can be prevented from obtaining the decryption key and the plaintext neural network code and the plaintext weight parameter. In addition, the ciphertext data is stored in an on-chip eFlash, eNVM, MRAM, or RRAM. Compared with an existing solution in which the neural network code and the weight parameter are stored in an off-chip memory, the foregoing neural network parameter deployment method can further improve a security level of the neural network code and the weight parameter.

Figures 7, 8:
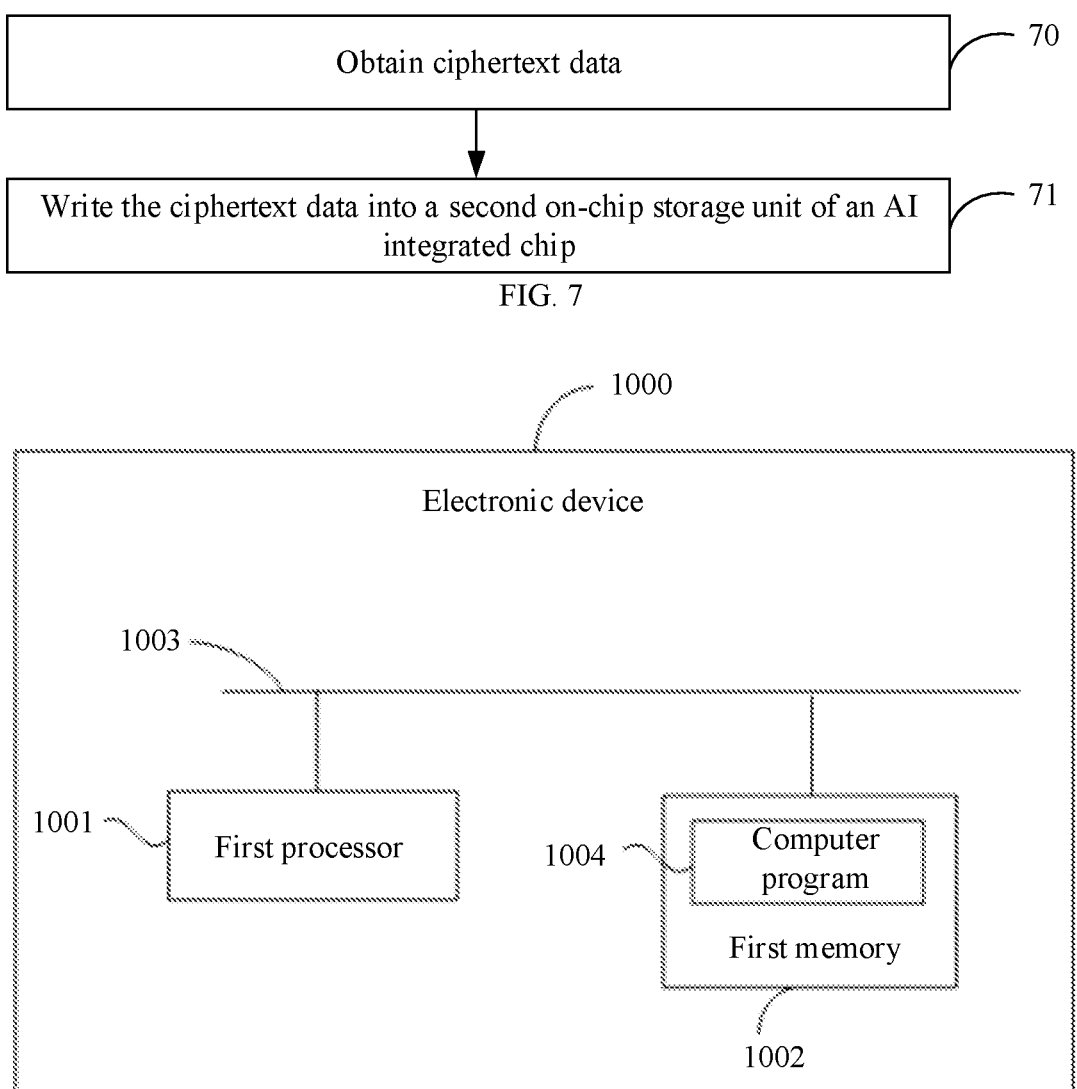
FIG. 7 is a schematic flowchart of a neural network parameter deployment method according to still another embodiment of this application.
FIG. 8 shows a possible electronic device according to an embodiment of this application.

FIG. 7 shows a neural network parameter deployment method according to an embodiment of this application. The neural network parameter deployment method is applied to a third processing end. The third processing end may be an electronic device on a device vendor side. In this embodiment, the neural network parameter deployment method includes the following steps.

Step 70: Obtain ciphertext data.

In some embodiments, the ciphertext data may be data obtained by encrypting neural network code and a weight parameter that are associated with the NPU 12. For example, an AI vendor may encrypt the neural network code and the weight parameter to obtain the ciphertext data, and provide the ciphertext data to a device vendor.

In some embodiments, after obtaining the ciphertext data, the AI vendor may provide the ciphertext data to the device vendor in an online or offline manner. For example, the device vendor may purchase the ciphertext data from the AI vendor in an offline manner, or the device vendor may conduct an online transaction with the AI vendor. For example, the device vendor requests the ciphertext data from a cloud server of the AI vendor. After confirming the online transaction, the cloud server of the AI vendor sends the ciphertext data to the device vendor (a device such as a PC or a server on the device vendor side).

Step 71: Write the ciphertext data into a second on-chip storage unit 14 of an AI integrated chip 10.

In some embodiments, when the device vendor obtains the ciphertext data, the device vendor may write the ciphertext data into the second on-chip storage unit 14 of the AI integrated chip 10 by using the third processing end. The second on-chip storage unit 14 may include any one of an eFlash, eNVM, MRAM, or RRAM. For example, the third processing end may be a burning device, and the device vendor writes the ciphertext data into the second on-chip storage unit 14 of the AI integrated chip 10 by using the burning device.

In some embodiments, a decryption key for decrypting ciphertext data is pre-written into a OTP device of the AI integrated chip. For example, a chip vendor may write the decryption key or a descrambling key into the OTP device of the AI integrated chip 10, and then the chip vendor provides the AI integrated chip 10 into which the decryption key or the descrambling key is implanted to the device vendor.

In some embodiments, the decryption key or the descrambling key stored in the OTP device may be read by a decryption unit 16 under control of read logic formulated by a program set in a CPU 11 or an NPU 12, and a read operation may be set to be invisible to an application software. In addition, permission to allow only the decryption unit 16 to read may be set in the OTP device, so that leakage of the decryption key or the descrambling key is avoided. For example, only one read port is disposed in the key storage unit 15, and the read port is electrically connected only to the decryption unit 16.

In the foregoing neural network parameter deployment method, for the device vendor, the chip vendor writes the decryption key into the OTP device of the AI integrated chip and then provides the AI integrated chip that stores the decryption key to the device vendor. In addition, the AI vendor provides the neural network code and the weight parameter to the device vendor in a ciphertext form, so that the device vendor cannot obtain the decryption key, and plaintext neural network code and a plaintext weight parameter. In addition, the ciphertext data is stored in an on-chip eFlash, eNVM, MRAM, or RRAM. Compared with an existing solution in which the neural network code and the weight parameter are stored in an off-chip memory, the foregoing neural network parameter deployment method can further improve a security level of the neural network code and the weight parameter.

FIG. 8 is a schematic diagram of a hardware structure of an electronic device 1000 according to an embodiment of this application. As shown in FIG. 8, the electronic device 1000 may include a first processor 1001, a first memory 1002, and a first communication bus 1003. The first memory 1002 is configured to store one or more computer programs 1004. The one or more computer programs 1004 are configured to be executed by the first processor 1001. The one or more computer programs 1004 include instructions, and the instructions may be used to perform, in the electronic device 1000, the neural network parameter deployment method shown in FIG. 5.

It may be understood that the structure shown in this embodiment does not constitute a specific limitation on the electronic device 1000. In some other embodiments, the electronic device 1000 may include more or fewer components than those shown in the figure, or some components may be combined, or some components may be split, or different component arrangements may be used.

The first processor 1001 may include one or more processing units. For example, the first processor 1001 may include an application processor (AP), a modem processor, a graphics processing unit (GPU), an image signal processor (ISP), a controller, a video codec, a digital signal processor (dDSP), a baseband processor, an NPU, and/or the like. Different processing units may be independent components, or may be integrated into one or more processors.

A memory may be further disposed in the first processor 1001, and is configured to store instructions and data. In some embodiments, the memory in the first processor 1001 is a cache memory. The memory may store instructions or data that have been recently used or cyclically used by the first processor 1001. If the first processor 1001 needs to use the instructions or the data again, the instructions or the data may be directly invoked from the memory. This avoids repeated access and reduces waiting time of the first processor 1001, so that system efficiency is improved.

In some embodiments, the first processor 1001 may include one or more interfaces. The interface may include an Inter-Integrated Circuit (I2C) interface, an Inter-Integrated Circuit Sound (I2S) interface, a pulse-code modulation (PCM) interface, a universal asynchronous receiver/transmitter (UART) interface, a Mobile Industry Processor Interface (IMIPI), a general-purpose input/output (GPIO) interface, a Subscriber Identity Module (SIM) interface, a Universal Serial Bus (USB) interface, and/or the like.

In some embodiments, the first memory 1002 may include a high-speed random access memory, and may further include a non-volatile memory, for example, a hard disk, a memory, a plug-in hard disk, a smart memory card (SMC), a secure digital (SD) card, a flash card, at least one magnetic disk storage device, a flash device, or another volatile solid-state storage device.

This embodiment further provides a computer storage medium. The computer storage medium stores computer instructions, and when the computer instructions are run on an electronic device, the electronic device is enabled to perform the foregoing related method steps to implement the neural network parameter deployment method shown in FIG. 5.

This embodiment further provides a computer program product. When the computer program product is run on a computer, the computer is enabled to perform the foregoing related steps to implement the neural network parameter deployment method shown in FIG. 5.

The electronic device, the computer storage medium or the computer program product, provided in this embodiment, is configured to perform the corresponding method provided above. Therefore, for beneficial effects that can be achieved by the electronic device, the computer storage medium or the computer program product, refer to beneficial effects in the corresponding method provided above. Details are not described herein again.

Based on the foregoing descriptions of the implementations, a person skilled in the art may clearly understand that, for the purpose of convenient and brief descriptions, division of the foregoing functional modules is merely used as an example for descriptions. During actual application, the foregoing functions may be allocated to different functional modules for implementation based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are examples. For example, division into the modules or units is logical function division, and may be other division in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium, and includes a plurality of instructions for instructing a device (which may be a single-chip microcomputer, a chip, or the like) or a processor to perform all or some of the steps of the method in embodiments of this application. The foregoing storage medium includes any medium that can store program code, such as a USB flash drive, a removable hard disk, a read-only memory (ROM), a RAM, a magnetic disk, or an optical disc.

The foregoing descriptions are implementations of this application, and are not intended to limit the protection scope of this application. Any variation or replacement within the technical scope disclosed in this application shall fall within the protection scope of this application.

What is claimed is:

1. An artificial intelligence (AI) computing apparatus, comprising:
  an AI integrated chip comprising:
    a central processing unit (CPU);
    a neural network processing unit (NPU);
    a first on-chip storage unit; and
    a second on-chip storage unit configured to store:
      second neural network code that is associated with the NPU; and
      a second weight parameter that is associated with the NPU; and
  an off-chip memory coupled to the first on-chip storage unit and configured to:
    store first neural network code that is associated with the NPU; and
    store a first weight parameter that is associated with the NPU,
  wherein the NPU is configured to:
    process specified data based on the first neural network code, the second neural network code, the first weight parameter, and the second weight parameter;
    set, in the second on-chip storage unit, permission to allow only the NPU to read the second on-chip storage unit; and
    set, in the second on-chip storage unit, permission to allow only the CPU to write to the second on-chip storage unit.

2. The AI computing apparatus of claim 1, wherein the AI integrated chip further comprises a third on-chip storage unit, and wherein the third on-chip storage unit is configured to:
  read the first neural network code from the off-chip memory;
  read the first weight parameter from the off-chip memory; and
  cache at least a part of the first neural network code or the first weight parameter.

3. The AI computing apparatus of claim 2, wherein the first on-chip storage unit comprises a static random-access memory (SRAM), wherein the off-chip memory comprises a dynamic random-access memory (DRAM), wherein the second on-chip storage unit comprises any of an embedded flash memory (eFlash), an embedded non-volatile memory (eNVM), a magnetic random-access memory (MRAM), or a resistive random-access memory (RRAM), and wherein the third on-chip storage unit comprises any of an eFlash, an eNVM, an MRAM, or an RRAM.

4. The AI computing apparatus of claim 1, wherein the CPU is further configured to:

receive ciphertext data, wherein the ciphertext data is based on encrypting the second neural network code and the second weight parameter; and write the ciphertext data into the second on-chip storage unit.

5. The AI computing apparatus of claim 4, wherein the AI integrated chip further comprises:

a key storage unit configured to store a decryption key before the ciphertext data is written into the second on-chip storage unit; and a decryption unit configured to set, in the key storage unit, permission to allow only the decryption unit to read the key storage unit, and wherein the NPU is further configured to:

read the ciphertext data from the second on-chip storage unit; and invoke the decryption unit to decrypt the ciphertext data using the decryption key to obtain the second neural network code and the second weight parameter.

6. The AI computing apparatus of claim 1, wherein the AI integrated chip further comprises:

a key storage unit, wherein the key storage unit is configured to store a decryption key; and a decryption unit configured to set, in the key storage unit, permission to allow only the decryption unit to read the key storage unit, wherein the CPU is configured to:

receive ciphertext data, wherein the ciphertext data is based on encrypting the second neural network code and the second weight parameter; and invoke the decryption unit to decrypt the ciphertext data using the decryption key, and wherein the CPU is further configured to:

decrypt the second neural network code and the second weight parameter to obtain decrypted data; and write the decrypted data into the second on-chip storage unit.

7. The AI computing apparatus of claim 6, wherein the key storage unit comprises a one-time programmable (OTP) device.

8. The AI computing apparatus of claim 1, wherein the off-chip memory is further configured to store the specified data and a processing result of the specified data, and wherein the first on-chip storage unit is configured to:

read the specified data from the off-chip memory; and cache the specified data read.

9. An artificial intelligence (AI) integrated chip, comprising:

a central processing unit (CPU);

a neural network processing unit (NPU);

a first on-chip storage unit;

a second on-chip storage unit comprising one of an embedded flash memory (eFlash), an embedded non-volatile memory (eNVM), a magnetic random-access memory (MRAM), or a resistive random-access memory (RRAM), wherein the second on-chip storage unit is configured to store:

neural network code that is associated with the NPU; and a weight parameter that is associated with the NPU, wherein the NPU is configured to process specified data based on the neural network code and the weight parameter;

a key storage unit configured to store a decryption key; and a decryption unit configured to set, in the key storage unit, permission to allow only the decryption unit to read the key storage unit, and wherein the CPU is configured to:

receive ciphertext data, wherein the ciphertext data is based on encrypting the neural network code and the weight parameter;

invoke the decryption unit to decrypt the ciphertext data using the decryption key;

decrypt the neural network code and the weight parameter to obtain decrypted data; and write the decrypted data into the second on-chip storage unit.

10. The AI integrated chip of claim 9, wherein the second on-chip storage unit comprises a read port and a write port, wherein the read port is electrically connected to the NPU, and wherein the write port is electrically connected to the CPU.

11. The AI integrated chip of claim 9, wherein the AI integrated chip further comprises a third on-chip storage unit configured to:

read the neural network code from an off-chip memory;

read a first weight parameter from an off-chip memory; and cache at least a part of the neural network code or the weight parameter.

12. The AI integrated chip of claim 9, wherein the CPU is further configured to write the ciphertext data into the second on-chip storage unit.

13. The AI integrated chip of claim 12, wherein the key storage unit is configured to store the decryption key before the ciphertext data is written into the second on-chip storage unit, and wherein the NPU is further configured to:

read the ciphertext data from the second on-chip storage unit; and invoke the decryption unit to decrypt the ciphertext data using the decryption key to obtain the neural network code and the weight parameter.

14. The AI integrated chip of claim 9, wherein the key storage unit comprises a one-time programmable (OTP) device.

15. The AI integrated chip of claim 9, wherein the NPU is further configured to:

set, in the second on-chip storage unit, permission to allow only the NPU to read the second on-chip storage unit; and set, in the second on-chip storage unit, permission to allow only the CPU to write to the second on-chip storage unit.

16. A neural network parameter deployment method, comprising:

storing, in an off-chip memory, first neural network code that is associated with a neural network processing unit (NPU);

storing, in the off-chip memory, a first weight parameter that is associated with the NPU;

storing, in a first on-chip storage unit, second neural network code that is associated with the NPU;

storing, in the first on-chip storage unit, a second weight parameter that is associated with the NPU;

processing, with the NPU, specified data based on the first neural network code, the second neural network code, the first weight parameter, and the second weight parameter;

setting, by the NPU in the first on-chip storage unit, permission to allow only the NPU to read the first on-chip storage unit; and setting, by the NPU in the first on-chip storage unit, permission to allow only a central processing unit (CPU) to write to the first on-chip storage unit.

17. The neural network parameter deployment method of claim 16, further comprising caching, by a second on-chip storage unit, the first neural network code and the first weight parameter into a third on-chip storage unit after reading the first neural network code and the first weight parameter from the off-chip memory.

18. The neural network parameter deployment method of claim 16, further comprising:

receiving, by a central processing unit (CPU), ciphertext data from an encryption apparatus; and writing, by the CPU, the ciphertext data into the first on-chip storage unit, wherein the ciphertext data is based on encrypting the second neural network code and the second weight parameter.

19. The neural network parameter deployment method of claim 18, further comprising invoking, by the NPU, a pre-stored decryption key to decrypt the ciphertext data to obtain the second neural network code and the second weight parameter when the NPU reads the ciphertext data from the first on-chip storage unit.

20. The neural network parameter deployment method of claim 16, further comprising:

receiving, by a central processing unit (CPU), ciphertext data from an encryption apparatus, wherein the ciphertext data is based on encrypting the second neural network code and the second weight parameter;

invoking, by the NPU, a pre-stored decryption key to decrypt the ciphertext data;

obtaining, by the NPU, the second neural network code and the second weight parameter through decryption; and writing, by the NPU, the second neural network code and the second weight parameter into the first on-chip storage unit.

* * * * *